United States Patent
Oohashi (10) Patent No.: US 6,614,217 B2
(45) Date of Patent: Sep. 2, 2003

(54) POWER SUPPLY NEGATIVE PHASE DETECTING CIRCUIT

(75) Inventor: Eiji Oohashi, Ora-gun (JP)

(73) Assignees: Sanyo Electronic Co., Ltd., Osaka (JP); Sanyo Electric Air Conditioning, Ashikaga (JP)

( * ) Notice: Subject to any disclaimer, the term of this patent is extended or adjusted under 35 U.S.C. 154(b) by 55 days.

(21) Appl. No.: 09/915,655

(22) Filed: Jul. 26, 2001

(65) Prior Publication Data
US 2002/0027432 A1 Mar. 7, 2002

(30) Foreign Application Priority Data
Aug. 10, 2000 (JP) ........................ 2000-242621

(51) Int. Cl.$^7$ .................... G01R 19/00; G01R 19/04
(52) U.S. Cl. .................... 324/107; 324/103 R
(58) Field of Search .................... 324/107, 108, 324/66, 76.77, 76.82, 86, 103 R; 361/76, 77, 79, 85, 87, 92; 340/635, 658

(56) References Cited

U.S. PATENT DOCUMENTS

| | | | | |
|---|---|---|---|---|
| 4,119,910 A | * | 10/1978 | Hayashi | 324/76.77 |
| 4,553,018 A | * | 11/1985 | Kondo et al. | 219/130.51 |
| 5,062,278 A | * | 11/1991 | Sugiyama | 361/22 |
| RE33,874 E | * | 4/1992 | Miller | 324/103 R |
| 5,184,063 A | * | 2/1993 | Eisenhauer | 324/76.77 |
| 5,764,022 A | * | 6/1998 | Kazama et al. | 363/37 |
| 5,828,309 A | * | 10/1998 | Kumakura et al. | 324/66 |
| 6,252,752 B1 | * | 6/2001 | Nagahama | 361/31 |
| 6,254,352 B1 | * | 7/2001 | Nizato et al. | 318/374 |

FOREIGN PATENT DOCUMENTS

| | | | | |
|---|---|---|---|---|
| EP | 1180840 A2 | * | 2/2002 | H02H/7/97 |
| JP | 8-289466 | | 5/1998 | |

* cited by examiner

Primary Examiner—Kamand Cuneo
Assistant Examiner—Jermele Hollington
(74) Attorney, Agent, or Firm—Darby & Darby (57) ABSTRACT

A power supply negative-phase detecting circuit (10) for electronic equipment (12) using a three-phase AC power supply source includes a pulse generator (13) for generating a first pulse indicating the phase difference between any pair of two phases of three-phase AC power to be supplied to the electronic equipment and a second pulse indicating the phase difference between another pair of two phases of the three-phase AC power, a differentiating circuit (25) for generating a third pulse from the second pulse in synchronism with the rise-up of the second pulse so that the third pulse has a pulse width smaller than the phase difference between the first and second pulses, and a switching unit (14) for subjecting the first pulse and the third pulse to OR operation and turning on/off the power supply to be supplied to the electronic equipment on the basis of the OR operation result of the first and third pulses.

6 Claims, 6 Drawing Sheets

(A) POWER SUPPLY WAVEFORMS

(B) POWER SUPPLY WAVEFORMS

(C) WAVEFORM AT EACH POINT IN CASE OF POSITIVE PHASE

(D) WAVEFORM AT EACH POINT WHEN S-PHASE AND T-PHASE ARE REPLACES (E) WAVEFORM AT EACH POINT WHEN R-PHASE AND S-PHASE ARE REPLACES (F) WAVEFORM AT EACH POINT WHEN R-PHASE AND T-PHASE ARE REPLACES

POWER SUPPLY NEGATIVE PHASE DETECTING CIRCUIT

BACKGROUND OF THE INVENTION

1. Field of the Invention

The present invention relates to a negative phase detecting circuit for a three-phase three-wire or three-phase four-wire type power supply source used as a power supply source for electronic equipment using a three-phase induction motor such as an air conditioner or the like.

2. Description of the Related Art

In a case where three-phase AC power is supplied to electronic equipment (for example, an air conditioner) using a three-phase induction motor (for example, a compressor of an air conditioner or the like), if the wiring between the three-phase AC power supply source and the electronic equipment is erroneous, there would occur such a disadvantage that the three-phase induction motor is rotated in the opposite direction to the expected direction or the like. Therefore, there has been proposed a negative phase detecting circuit for power supply for judging whether the wiring between a three-phase AC power supply source and electronic equipment is correct or not, and also whether the three-phase AC power supply source itself is proper or not (disclosed in Japanese Laid-open Patent Application No. Hei-8-289466).

Figure 1:
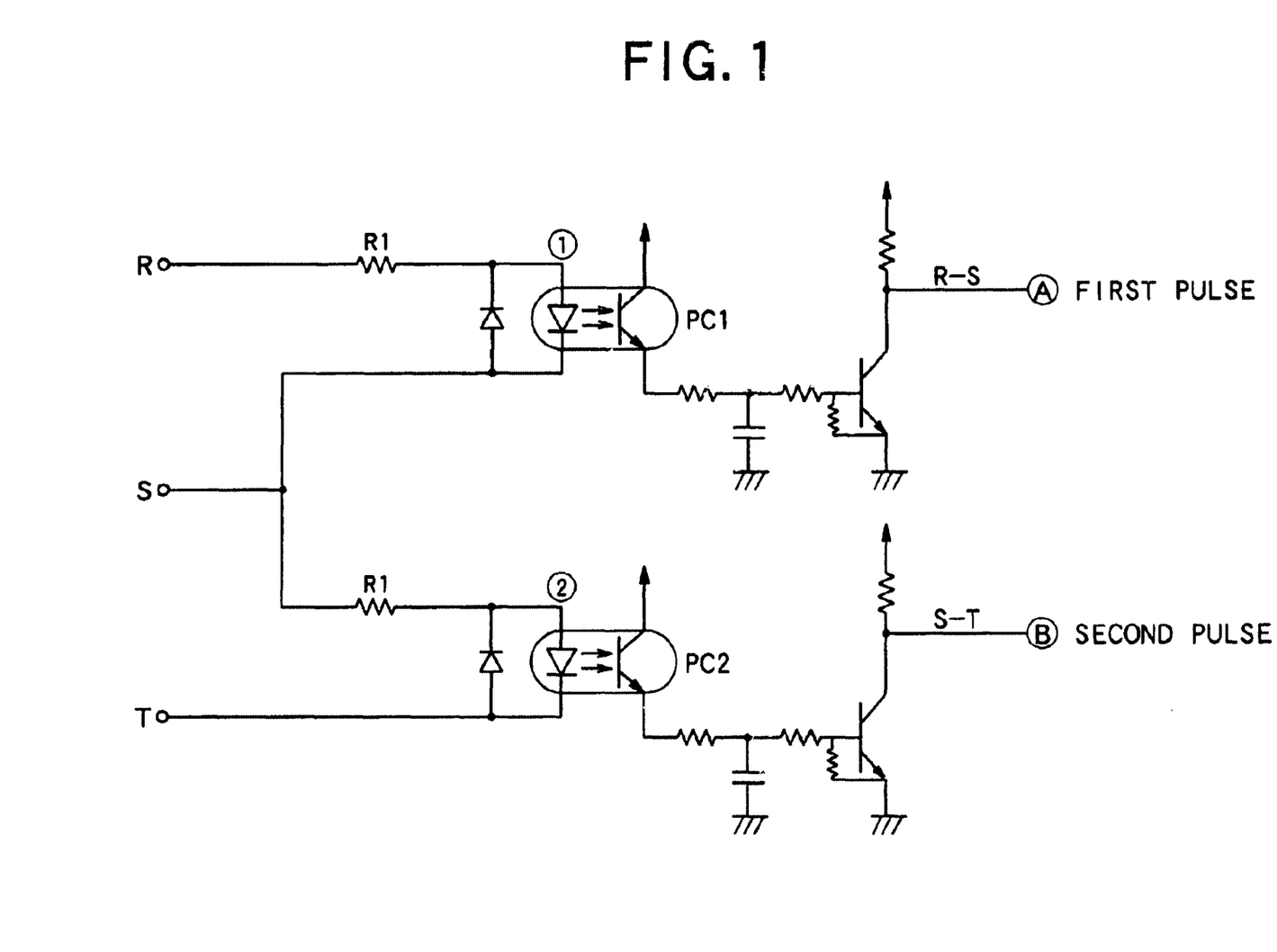
FIG. 1 is an electrical circuit diagram showing a conventional three-phase three-wire type power supply negative phase detecting circuit.

FIG. 1 is a circuit diagram showing the construction of the power supply negative phase detecting circuit as described above.

According to the power supply negative phase detecting circuit shown in FIG. 1, two kinds of pulses, that is, a first pulse A (R-S) and a second pulse B (S-T) are generated from AC voltages of R-phase, S-phase and T-phase, and the phase difference between the first and second pulses is read out by a microcomputer to judge whether the phase is positive (correct wiring) or negative (erroneous wiring).

Further, there is known a low-cost outdoor unit of an only-cooling type air conditioner which is not equipped with any outdoor control board for controlling an outdoor unit. In this type low-cost outdoor unit, the control of the outdoor unit is carried out by the indoor side, and also a negative-phase preventing relay is provided to detect the negative phase and protect the outdoor unit under the negative-phase state.

However, since the internal parts of the negative-phase preventing relay are broken due to high voltage noises (thunder surge or the like) and thus a protecting device such as an arrester or the like must be separately equipped.

SUMMARY OF THE INVENTION

An object of the present invention is to perform negative phase detection by adding a simple electrical circuit to low-cost equipment and protect the electrical circuit from high voltage noises without mounting a varistor, an arrester or the like on a board, whereby the negative-phase detection, the protecting operation and the other functional performance can be supplied in a lower cost than when a negative-phase preventing relay is used.

In order to attain the above object, according to a first aspect of the present invention, there is provided a power supply negative-phase detecting circuit for electronic equipment using a three-phase AC power supply source, characterized by comprising: a pulse generator for generating a first pulse indicating the phase difference between any pair of two phases of three-phase AC power to be supplied to the electronic equipment, and a second pulse indicating the phase difference between another pair of two phases of the three-phase AC power, a differentiating circuit for generating a third pulse from the second pulse in synchronism with the rise-up of the second pulse so that the third pulse has a pulse width smaller than the phase difference between the first and second pulses; and a switching unit for subjecting the first pulse and the third pulse to AND operation and turning on/off the power supply to the electronic equipment on the basis of the AND operation result of the first and third pulses.

According to a second aspect of the present invention, in the power supply negative-phase detecting circuit of the first aspect of the present invention, when the three-phase AC power to be supplied to the electronic equipment has negative phase, the switching unit turns off the power supply to the electronic equipment.

According to a third aspect of the present invention, in the power supply negative-phase detecting circuit of the first aspect of the present invention, the differentiating circuit comprises a capacitor and a resistor.

According to a fourth aspect of the present invention, in the power supply negative-phase detecting circuit of the third aspect of the present invention, the switching unit comprises a first transistor having an emitter to which the first pulse is input, a second transistor having a base to which the third pulse is input, the base of said first transistor being connected to the collector of the second transistor to perform the AND operation between the first and third pulses, a smoothing capacitor which is charged in accordance with the AND operation result, a third transistor that is connected to the smoothing capacitor and turned on/off in accordance with the charging of said smoothing capacitor, and a relay switch for switching on/off the power supply to said electronic equipment in accordance with the ON/OFF operation of the third transistor.

According to a fifth aspect of the present invention, in the power supply negative-phase detecting circuit of the first aspect of the present invention, there is further provided alarm means for emitting an alarm when the three-phase AC power to be supplied to the electronic equipment has negative phase.

According to a sixth aspect of the present invention, in the power supply negative-phase detecting circuit of the fifth aspect of the present invention, when the three-phase AC power to be supplied to the electronic equipment has negative phase, the switching unit turns off the power supply to the electronic equipment, and simultaneously the alarm means emits the alarm.

DETAILED DESCRIPTION OF THE PREFERRED EMBODIMENT

A preferred embodiment according to the present invention will be described with reference to the accompanying drawings.

Figure 2:
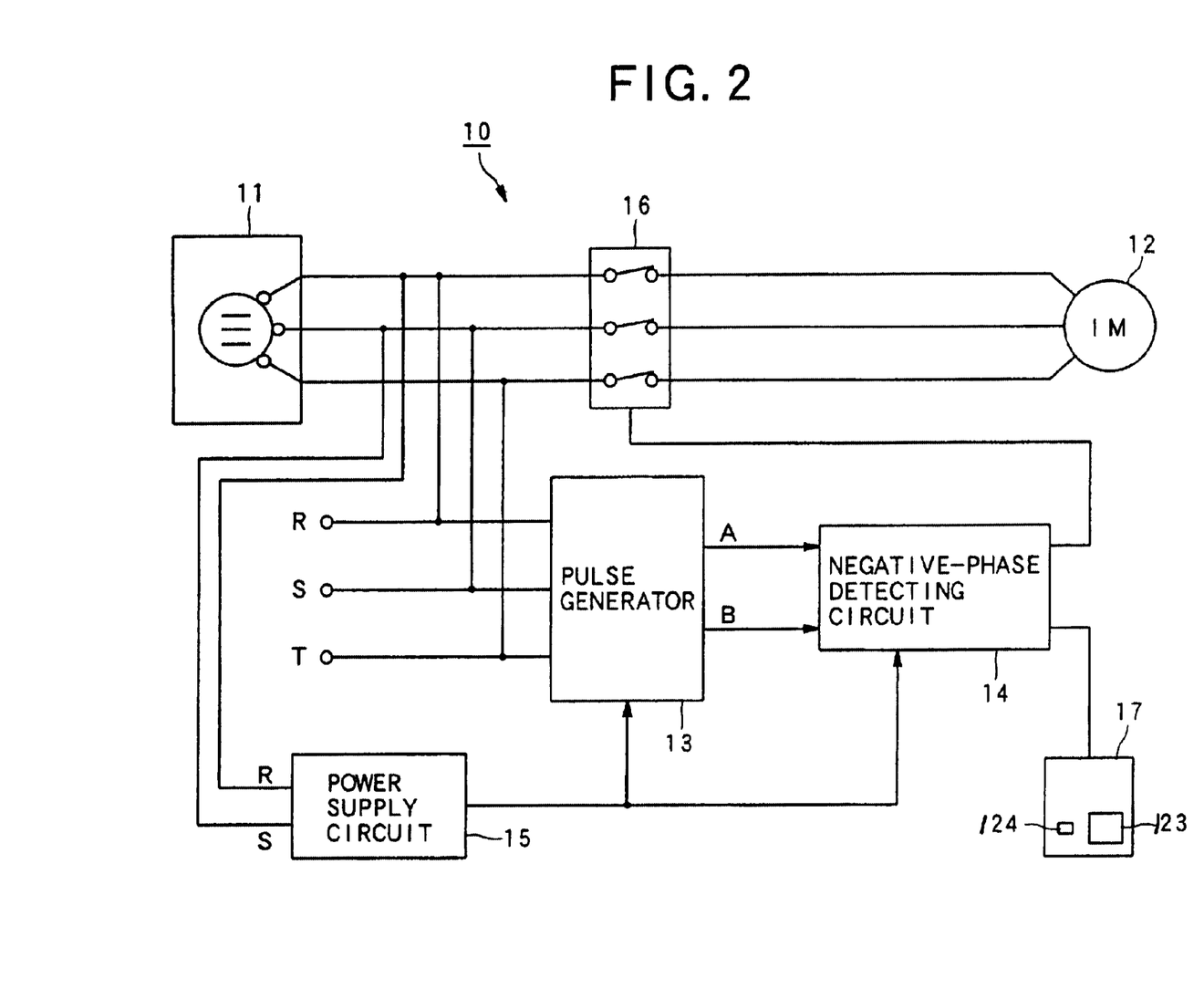
FIG. 2 is a block diagram showing an embodiment of a power supply negative phase detecting circuit according to the present invention.

FIG. 2 is a block diagram showing an embodiment of a power supply negative phase detecting circuit according to the present invention.

The power supply negative phase detecting circuit 10 shown in FIG. 2 is used when three-phase AC power is supplied from a three-phase four-wire type three-phase AC power supply source 11 to an induction motor 12 as electronic equipment to actuate the induction motor 12. The power supply negative phase detecting circuit 10 comprises a pulse generator 13, a negative phase detecting circuit 14, a power supply circuit 15, a power supply switch 16 and a remote controller 17.

Figure 3:
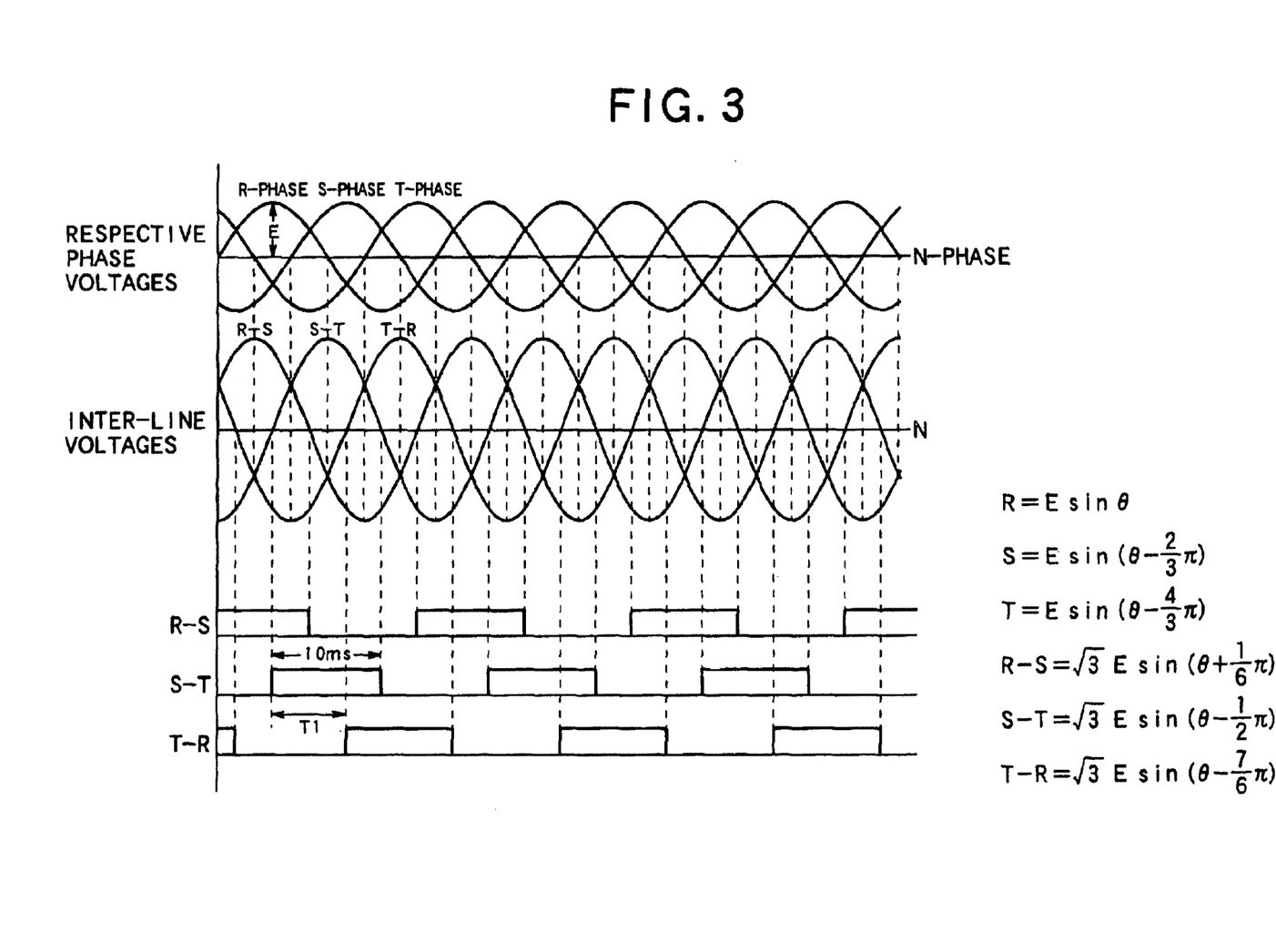
FIG. 3 is a diagram showing the waveforms of three-phase AC voltages of 50 Hz supplied from a three-phase AC power source.

The three-phase AC power supply source 11 generates three-phase AC power of R-phase, S-phase and T-phase as shown in FIG. 3. FIG. 3 shows the waveforms of the three-phase AC voltages having the power supply frequency of 50 Hz. In FIG. 3, N-phase represents a neutral phase. The N-phase is generally grounded, and thus the N-phase is handled as 0V (volt) in FIG. 3.

Specifically, the upper stage of FIG. 3 represents the voltage waveforms of the respective phases (R-phase, S-phase, T-phase), the middle stage of FIG. 3 represents the waveforms of the inter-line voltages of the respective phases (i.e., R-S, S-T, T-R), and the lower stage of FIG. 3 represents the waveforms of pulses generated on the basis of the inter-line voltages of (R-S), (S-T) and (T-R).

Figure 4:
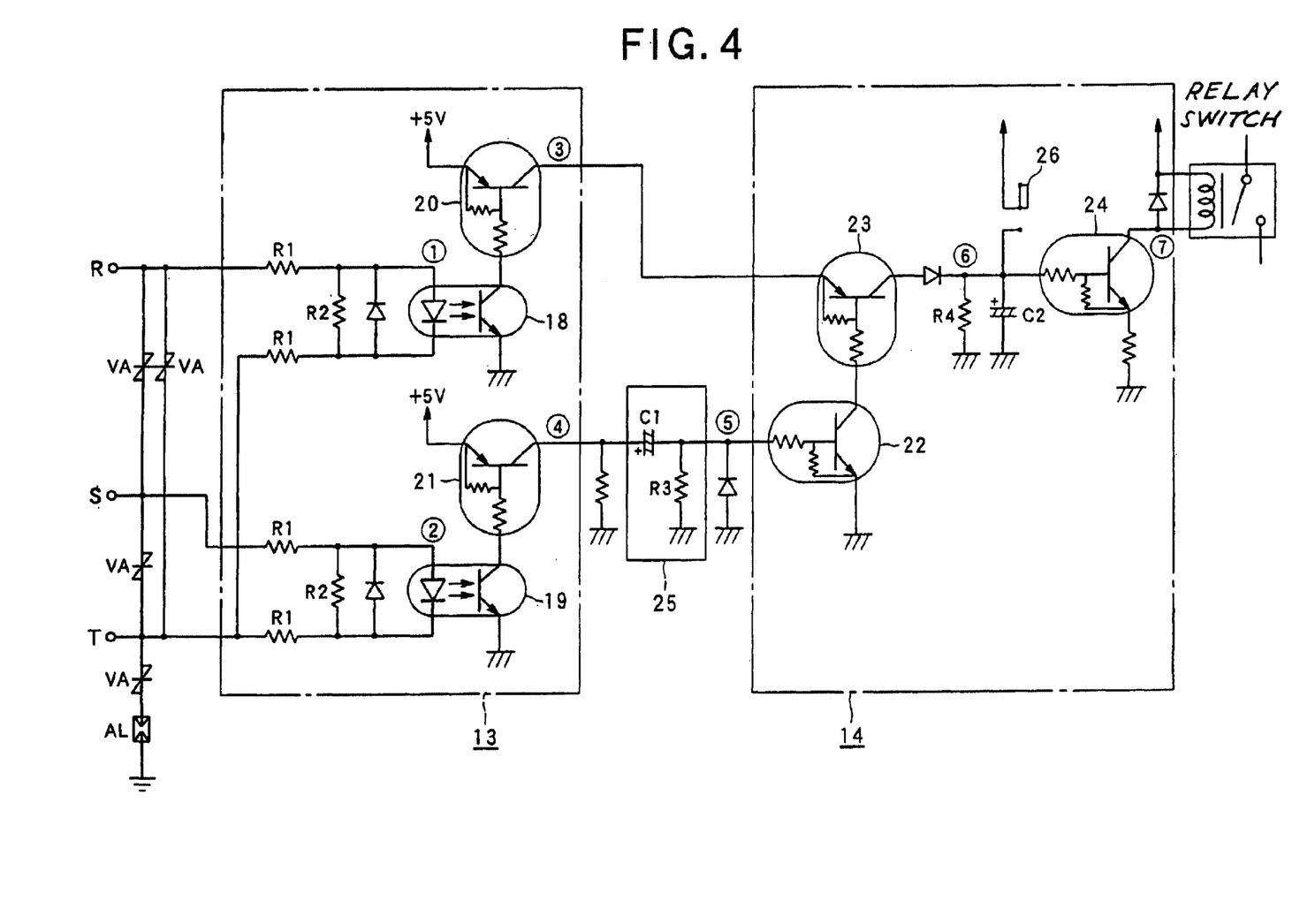
FIG. 4 is a electrical circuit diagram showing the construction of a pulse generator and a negative phase detecting circuit shown in FIG. 2.
Figure 6:
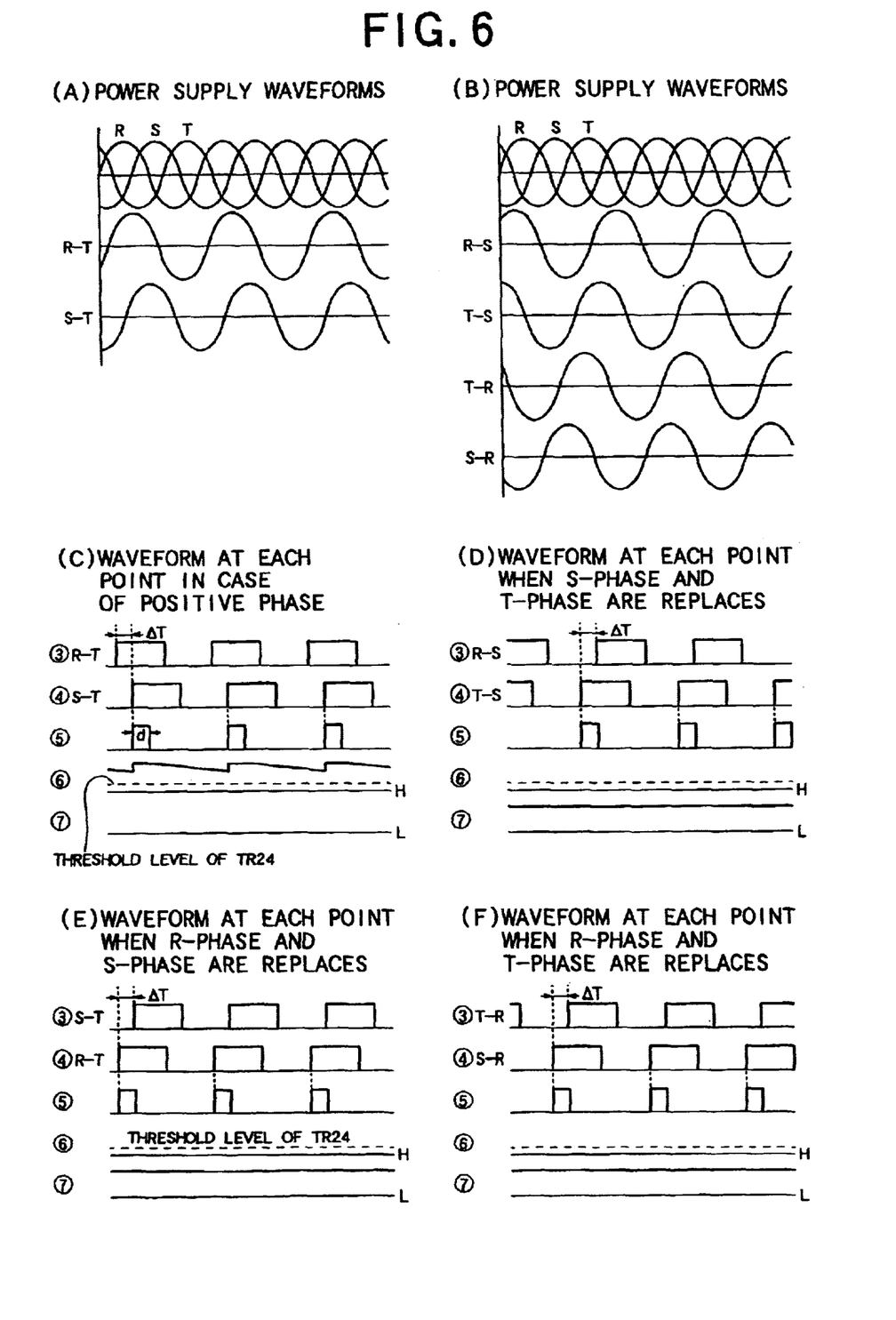
FIG. 6 is time charts showing the voltage waveforms of R-phase, S-phase and T-phase, the differential voltage waveforms thereof, and the voltage waveforms (pulses) generated at respective points the electrical circuit shown in FIG. 4.

FIG. 4 is an electrical circuit diagram showing the construction of the pulse generator 13 and the negative phase detecting circuit 14 of the power supply negative phase generating circuit shown in FIG. 2, and FIG. 6 is time charts showing the voltage waveforms (pulses) at some points (③ to ⑦) of the electrical circuit of FIG. 4 in various cases.

As shown in FIG. 4, the pulse generating circuit 13 is mainly constructed by photocouplers 18 and 19 and transistors 20 and 21, and it generates a first pulse A and a second pulse B from the three-phase AC voltages of R-phase, S-phase and T-phase from the three-phase AC power source 11. That is, the photocoupler 18 and the transistor 20 generates the first pulse A (see FIG. 5) from the AC voltages of R-phase and S-phase, and the photocoupler 19 and the transistor 21 generates the second pulse B (see FIG. 5) from the AC voltages of S-phase and T-phase. Further, the negative phase detecting circuit 14 is mainly constructed by three transistors 22, 23 and 24.

Figure 5:
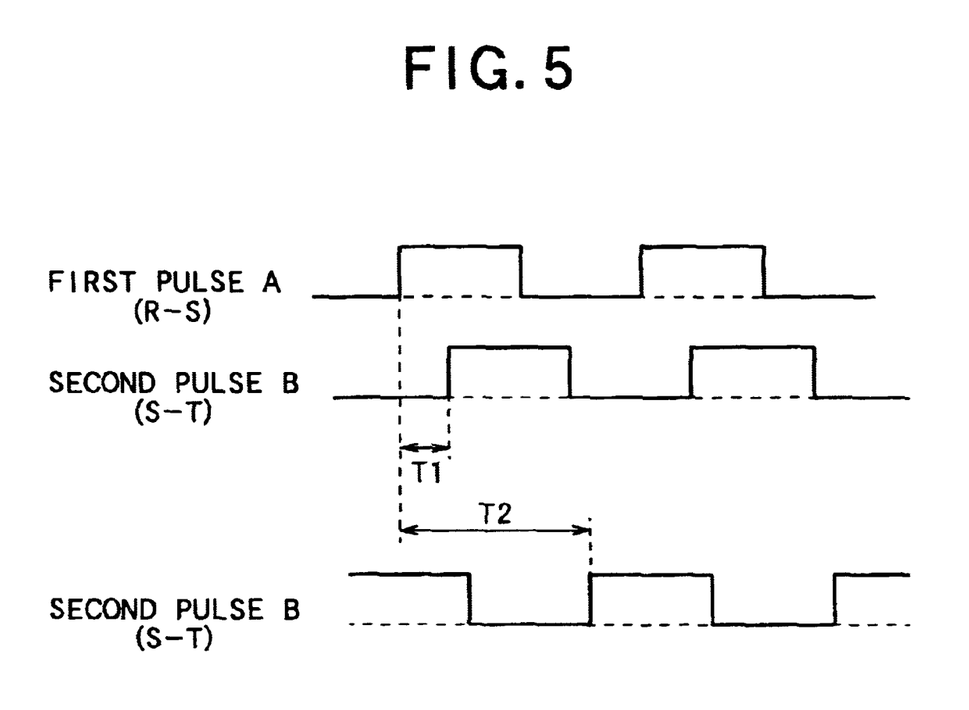
FIG. 5 is a waveform diagram showing a first pulse A and a second pulse B generated in the pulse generator shown in FIG. 2.

Here, the pulse width of the first pulse A and the second pulse B is equal to about 10 ms (milli-second) when the frequency of the three-phase AC power source 11 is equal to 50 Hz, and also to about 8.3 ms when the frequency of the three-phase AC power source 11 is equal to 60 Hz.

The power supply circuit 15 takes any two phase AC power from the three-phase AC power supply source 11 (in this embodiment, AC power of R-phase and S-phase) to convert the two-phase AC power to DC power, and then supplies the DC power to the electrical circuit shown in FIG. 4. In this embodiment, the DC power having DC voltage of +5V (volts) is supplied from the power supply circuit 15 to the pulse generator 13 and the negative phase detecting circuit 14.

Next, the operation of the electrical circuit (the pulse generator 13 and the negative phase detecting circuit 14) shown in FIG. 4 will be described with reference to FIGS. 4 and 6.

When the power supplied to the circuit shown in FIG. 4 has positive phase ((C) of FIG. 6), the sine-wave voltage of R-T is applied to the primary side ① of the photocoupler 18. The photocoupler 18 is turned on and thus the transistor 20 is turned on at the portion (period) where the voltage of R-phase>the voltage of T-phase, so that a (R-T) pulse train having approximately 50% duty occurs at ③. Likewise, a (S-T) pulse train occurs at ④. Here, comparing both the pulse trains, the (S-T) pulse train is delayed from the (R-T) pulse train by ΔT (3.3 ms for 50 Hz, 2.77 ms for 60 Hz) theoretically.

Next, when the respective phases are replaced by one another and thus the power has negative phase ((D) to (F) of FIG. 6), the pulse at ④ leads the pulse at ③ by ΔT in all the cases ((D) to (F)), and this is different from the positive phase case.

Therefore, a pulse at 5 (encircled) (pulse width d<t) synchronized with the rise-up of the pulse at 4 (encircled) is generated by a differentiating circuit 25 comprising a capacitor C1 and a resistor R3, and the pulses at 3 (encircled) and 5 (encircled) are subjected to AND operation. If the pulse at 3 (encircled) is H (High level), a smoothing capacitor C2 is charged and set to H level, and the point at 6 (encircled) is set to H level, so that the transistor 24 is turned on. Here, the discharge time constant (C2·R4//base resistance of transistor) must be set to a sufficiently long value as compared with the period of the power supply frequency.

Further, when the power supply source is negative phase, even if the pulses at 3 (encircled) and 5 (encircled) are subjected to AND operation, the capacitor C2 is not charged and the point at 6 (encircled) is kept under L state, so that the transistor 24 is kept to an OFF state, On the other hand, when the power supply source is positive phase, the transistor 24 is turned ON, and the switch RY is also turned on. Therefore, a power supply source serving as a load can be turned on/off or an alarm display can be made by connecting the primary side of the contact point of the switch RY to the power supply source and connecting the secondary side of the contact point of the switch RY to the load (three-phase induction motor or the like), that is, the electric circuit shown in FIG. 4 can be to meet various applied targets.

Further, when the negative phase detecting circuit is used for a single phase power supply source, the negative phase detection is not needed, and thus the circuit is designed so that the switch RY is kept to be forcedly turned on by turning on a switch 26 from the remote controller or the like.

When the power supply source is three-phase four-wire type (mainly, overseas), a neutral point N (neutral) phase is added to the three-phase three-wire, and thus the number of patterns of the negative phase is increased. When the N-phase and another phase are replaced by each other, the inter-line voltage is equal to 1/{2. Therefore, by selecting the constants of the input resistors R1 and R2, the photocoupler can be prevented from being turned on even when the N-phase is contaminated, and thus the negative-phase detection can be also performed in the case of the three-phase four-wire system.

The order of the power source R-S-T is S-T-R, T-R-S, it is impossible to perform the negative-phase detection.

However, if the order of the three phases is merely displaced, three-phase equipment practically suffers no damage, and thus there is no special problem.

According to the above-described embodiment, the negative phase detecting circuit 14 judges whether the wiring between the three-phase AC power source 11 (three-phase three-wire type or three-phase four-wire type) and the induction motor 12 is proper or not at the stage that the circuit 14 is started and then periodically generates the first pulse A and the second pulse B on the basis of the voltages (R, S, T) from the three-phase AC power source 11. Therefore, it can be accurately judged whether the three-phase AC power source 11 is proper or not and whether the wiring between the three-phase AC power source and the induction motor 12 is proper or not.

The present invention is not limited to the above-described embodiment, and various modifications may be made. For example, in. the above embodiment, the electronic equipment is assumed to be an induction motor 12. However, the present invention may be applied to other electronic equipment using a three-phase AC power source.

Further, in the above embodiment, when the three-phase AC power source 11 is abnormal or when the wiring between the three-phase AC power source 11 and the induction motor 12 is erroneous, a display indicating this fact may be displayed on a display portion 123 of the remote controller 17, or an alarm sound 124 may be generated.

Still further, the above embodiment is applied to the three-phase four-wire type wiring of R-phase, S-phase, T-phase, N-phase, however, the present invention may be applied to three-phase three-wire type wiring.

As described above, according to the present invention, the power supply negative phase detecting circuit does not need any microcomputer, and it can be implemented by a simple circuit. Therefore, it is more suitably applied to a low-cost type apparatus such as an only-cooling type air conditioner or the like to which low cost is required.

Further, according to the present invention, when negative-phase power is applied to electronic equipment, the power supply negative phase detecting circuit can pick up an alarm signal to make an alarm display. In addition, countermeasures to noise and surge can be taken.

What is claimed is:

1. A power supply negative-phase detecting circuit for electronic equipment using a three-phase AC power supply source, characterized by comprising: a pulse generator for generating a first pulse indicating a phase difference between any pair of two phases of three-phase AC power to be supplied to said electronic equipment, and a second pulse indicating the phase difference between another pair of two phases of the three-phase AC power; a differentiating circuit for generating a third pulse from the second pulse in synchronism with the rise-up of the second pulse so that the third pulse has a pulse width smaller than the phase difference between the first and second pulses; and a power supply switching unit for subjecting the first pulse and the third pulse to AND operation and turning on/off the power supply to said electronic equipment on the basis of the AND operation result of the first and third pulses.

2. The power supply negative-phase detecting circuit as claimed in claim 1, wherein when the three-phase AC power to be supplied to said electronic equipment has negative phase, said switching unit turns off the power supply to said electronic equipment.

3. The power supply negative-phase detecting circuit as claimed in claim 1, wherein said differentiating circuit comprises a capacitor and a resistor.

4. The power supply negative-phase detecting circuit as claimed in claim 3, wherein said power supply switching unit comprises a first transistor having an emitter to which the first pulse is input, a second transistor having a base to which the third pulse is input, the base of said first transistor being connected to the collector of said second transistor to perform the AND operation between the first and third pulses, a smoothing capacitor which is charged in accordance with the AND operation result, a third transistor that is connected to said smoothing capacitor and turned on/off in accordance with the charging of said smoothing capacitor, and a relay switch for switching on/off the power supply to said electronic equipment in accordance with the ON/OFF operation of said third transistor.

5. The power supply negative-phase detecting circuit as claimed in claim 1, further including alarm means for emitting an alarm when the three-phase AC power be supplied to said electronic equipment has negative phase.

6. The power supply negative-phase detecting circuit as claimed in claim 5, wherein when the three-phase AC power to be supplied to said electronic equipment negative phase, said switching unit turns off the power supply to said electronic equipment, and simultaneously said alarm means emits the alarm.

* * * * *

UNITED STATES PATENT AND TRADEMARK OFFICE
CERTIFICATE OF CORRECTION

PATENT NO. : 6,614,217 B2
DATED : September 2, 2003
INVENTOR(S) : Eiji Oohashi

It is certified that error appears in the above-identified patent and that said Letters Patent is hereby corrected as shown below:

<u>Title page,</u>
Item [73], Assignee, delete "Sanyo Electric Air Conditioning" and substitute
-- Sanyo Electric Air Conditioning Co., Ltd. --

Signed and Sealed this

Twenty-third Day of December, 2003

JAMES E. ROGAN
*Director of the United States Patent and Trademark Office*